(12) United States Patent
Goldwitz et al.

(10) Patent No.: US 6,871,614 B2
(45) Date of Patent: Mar. 29, 2005

(54) FREESTANDING ENCLOSURE FOR LARGE ANIMALS

(75) Inventors: Brian L. Goldwitz, Orange, CT (US); Marguerite Starr, Woodbury, CT (US)

(73) Assignee: North American Outdoor Products, LLC, West Haven, CT (US)

( * ) Notice: Subject to any disclaimer, the term of this patent is extended or adjusted under 35 U.S.C. 154(b) by 16 days.

(21) Appl. No.: 10/245,010

(22) Filed: Sep. 16, 2002

(65) Prior Publication Data

US 2003/0075114 A1 Apr. 24, 2003

Related U.S. Application Data

(60) Provisional application No. 60/322,334, filed on Sep. 14, 2001.

(51) Int. Cl.[7] .................................................. A01K 1/00
(52) U.S. Cl. ...................... 119/436; 119/522; 119/452; 52/79.5
(58) Field of Search .................................. 119/436, 441, 119/444, 445, 446, 516, 522, 523, 452, 455, 474, 502, 513, 514, 515; 5/99.1, 93.1, 93.2, 100; 52/127.6, 127.7, 127.8, 79.5

(56) References Cited

U.S. PATENT DOCUMENTS

| | | | | |
|---|---|---|---|---|
| 34,882 A | * | 4/1862 | Davis | 119/502 |
| 447,561 A | * | 3/1891 | Davis | 119/523 |
| 516,858 A | * | 3/1894 | Cleather et al. | 472/94 |
| 1,170,794 A | * | 2/1916 | Barnes | 119/513 |
| 1,251,926 A | * | 1/1918 | Schlesinger | 256/24 |
| 1,373,904 A | | 4/1921 | Miller | |
| 1,417,184 A | | 5/1922 | Lewis | |
| 1,692,470 A | | 11/1928 | Sederberg | |
| 1,719,769 A | * | 7/1929 | Kaufman | 248/311.2 |
| 1,949,189 A | | 2/1934 | Smith | |
| 1,994,193 A | | 3/1935 | Ferris | |
| 2,523,762 A | * | 9/1950 | Howard | 119/63 |
| 2,653,011 A | * | 9/1953 | Stancliff | 256/25 |
| 2,759,622 A | * | 8/1956 | Simmons et al. | 220/4.28 |
| 3,082,739 A | * | 3/1963 | Schloemer | 119/61 |
| 3,541,994 A | | 11/1970 | Meng et al. | |
| 3,550,559 A | * | 12/1970 | Long | 119/502 |
| 3,631,548 A | * | 1/1972 | Dahab | 5/99.1 |
| 3,706,105 A | * | 12/1972 | Nicholas te al. | 5/93.1 |
| 3,973,280 A | * | 8/1976 | Mathou | 5/99.1 |
| 4,019,464 A | * | 4/1977 | Miller | 119/840 |
| 4,070,989 A | | 1/1978 | Ganzel | |
| 4,090,472 A | | 5/1978 | York | |
| 4,176,621 A | | 12/1979 | Dill | |
| 4,273,072 A | | 6/1981 | Choisel | |
| 4,552,094 A | | 11/1985 | Johnson | |
| 4,669,138 A | * | 6/1987 | Kassai | 5/99.1 |
| 4,781,149 A | | 11/1988 | Hinnenkamp | |
| 4,787,603 A | * | 11/1988 | Norton | 256/25 |
| 5,036,799 A | * | 8/1991 | Jordan et al. | 119/61 |
| 5,058,863 A | * | 10/1991 | Maffet | 256/26 |

(Continued)

FOREIGN PATENT DOCUMENTS

GB 2156195 * 10/1985

Primary Examiner—Yvonne R. Abbott
(74) Attorney, Agent, or Firm—Edwards & Angell, LLP; George N. Chaclas

(57) ABSTRACT

A freestanding enclosure for temporarily retaining large animals has a frame including four upstanding corner posts with a plurality of vertical posts horizontally spaced between each upstanding corner post. A plurality of horizontal cross rails are vertically spaced and extend between each upstanding corner post and vertical post to form an area of retention. Connectors releasably secure the horizontal cross rails to the upstanding corner posts and vertical posts such that the enclosure can be easily assembled, disassembled, transported and stored. A plurality of panels block the openings formed in the frame. A door provides access with the area of retention.

11 Claims, 10 Drawing Sheets

U.S. PATENT DOCUMENTS

| | | | |
|---|---|---|---|
| 5,063,876 A | * 11/1991 | Harris | 119/513 |
| 5,116,256 A | * 5/1992 | Allen | 119/458 |
| 5,394,832 A | 3/1995 | Briley | |
| 5,555,681 A | * 9/1996 | Cawthon | 52/63 |
| 5,555,842 A | 9/1996 | Chocola et al. | |
| 5,564,367 A | * 10/1996 | Boyanton | 119/474 |
| 5,662,068 A | 9/1997 | Childs | |
| 5,967,091 A | 10/1999 | Zartman | |
| 6,014,781 A | * 1/2000 | Cone, II | 5/99.1 |
| 6,021,742 A | * 2/2000 | Cummings | 119/843 |
| 6,062,243 A | * 5/2000 | Tuch et al. | 135/124 |
| 6,098,217 A | * 8/2000 | Hammil | 5/93.1 |
| 6,152,080 A | * 11/2000 | Allen | 119/452 |
| 6,167,842 B1 | * 1/2001 | Akins et al. | 119/502 |
| 6,256,813 B1 | * 7/2001 | Aaron | 5/93.1 |
| 6,305,672 B1 | 10/2001 | Case et al. | |
| 6,318,297 B1 | 11/2001 | Hatfield | |
| 6,568,350 B1 | * 5/2003 | Savard et al. | 119/458 |
| 6,725,808 B2 | * 4/2004 | Campbell et al. | 119/513 |
| 2001/0011392 A1 | * 8/2001 | Homeyer | 5/99.1 |

* cited by examiner

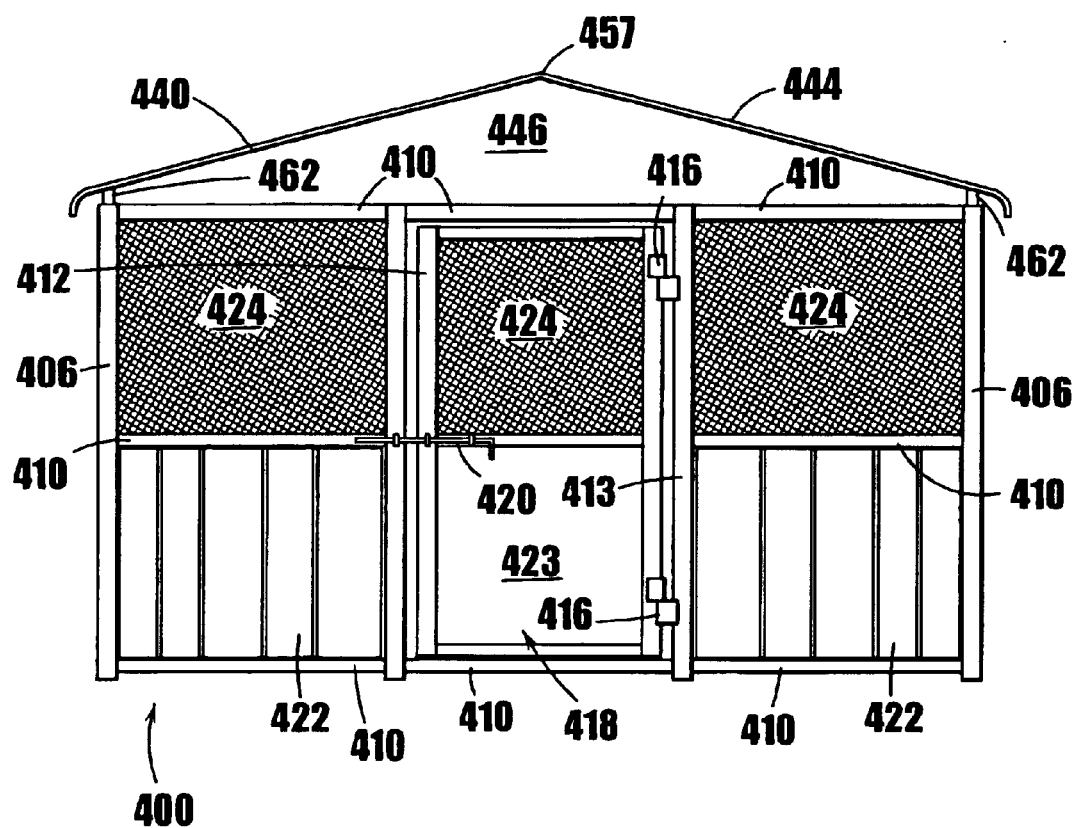

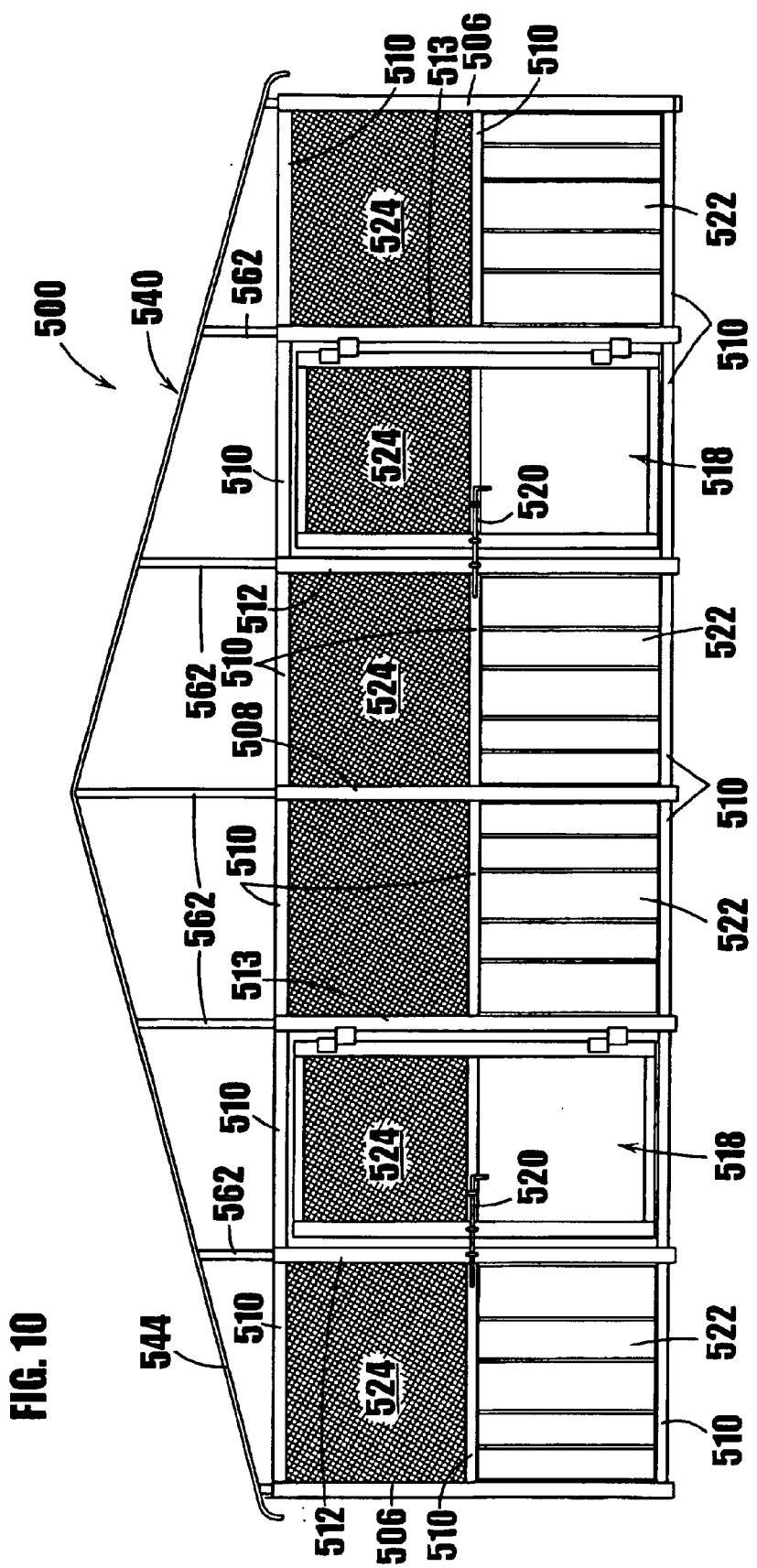

US 6,871,614 B2

FREESTANDING ENCLOSURE FOR LARGE ANIMALS

CROSS-REFERENCE TO RELATED APPLICATION

This application claims priority to U.S. Provisional Patent Application No. 60/322,334, filed Sep. 14, 2001, which is incorporated herein by reference.

BACKGROUND OF THE INVENTION

1. Field of the Invention

The subject disclosure relates to animal husbandry, and more particularly to an improved enclosure for large animals such as horses and cows.

2. Background of the Related Art

Structures such as corrals, barns and stalls for large animals are generally known in the art. Typically, a barn is a permanent structure with several stalls for separating the animals. Corrals are usually a simple fence adjacent to the barn. In view of the above, several systems have been developed to feed and otherwise tend to the animals in the barn and corral area as well as maintain the area of retention in an orderly and clean condition.

However, quite often a barn and corral is an unacceptable solution to the problem of housing animals. For example, an animal may be sick, injured or pregnant and therefore may need to have its motion and interaction with other animals limited yet still benefit from outdoor activity and interaction with other animals. Further, a new animal may need to be temporarily enclosed and provide gradual introduction to other animals and new surroundings. Moreover, suitable housing of animals may be required in a temporary location such as at a carnival or fair in which large volumes animals remain for relatively short periods of time.

There is a need, therefore, for a freestanding large animal enclosure which assembles, disassembles and transports easily, while assuring adequate retention of the large animal.

SUMMARY OF THE INVENTION

The present invention is directed to a freestanding enclosure for temporarily retaining large animals including four upstanding corner posts with vertical posts horizontally spaced between each upstanding corner post. A plurality of horizontal cross rails are vertically spaced and extend between respective upstanding corner posts and vertical posts. A plurality of connector fittings releasably secure the horizontal cross rails to the upstanding corner posts and vertical posts and to form a freestanding frame for the enclosure. A plurality of panels releasably secure to the horizontal cross rails, the upstanding corner posts and the vertical posts for enclosing the frame. A door pivotally mounts to one of the vertical posts to selectively close a passageway into the enclosure.

Accordingly, it is an advantage of the present invention to provide an enclosure for large animals with a relative ease of assembly and disassembly.

It is another advantage to provide an enclosure without any protruding edges, sharp protruding parts or hazardous openings so as to minimize the danger of injury to animals therein.

It is still another advantage of the invention to provide an enclosure which employs standardized parts which are interchangeable to vary the configuration of the enclosure while being simple, inexpensive and durable.

It should be appreciated that the present invention can be implemented in numerous ways, including without limitation as a process, an apparatus, a system, a device or a method now known and later developed. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the drawings wherein:

FIG. 8 is a front view of an equine enclosure having a roof in accordance with the subject invention.

FIG. 10 is a plan front view of yet another equine enclosure in accordance with the subject invention.

DETAILED DESCRIPTION OF PREFERRED EMBODIMENTS

Figure 1:
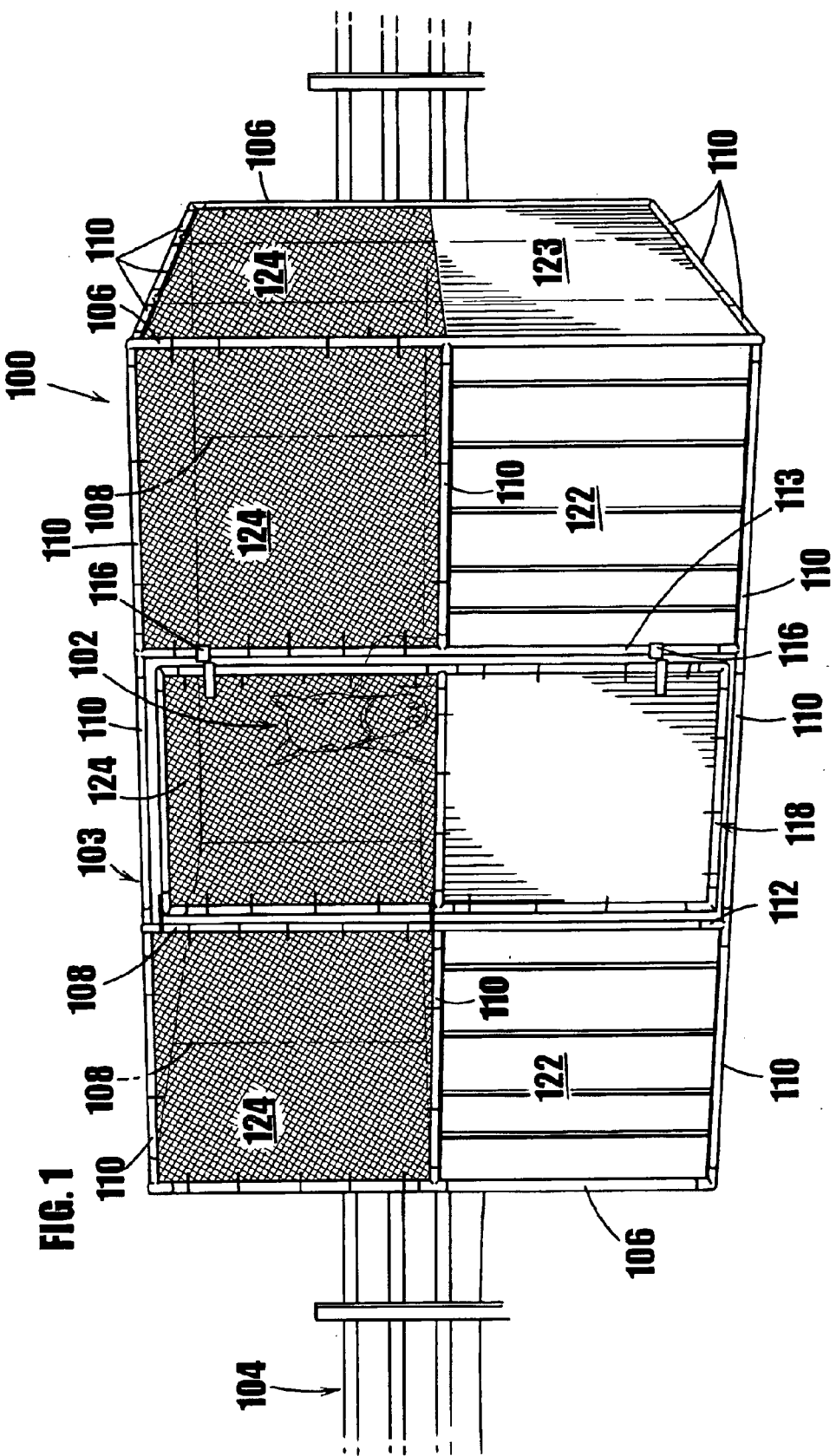
FIG. 1 is a perspective view of an equine enclosure in accordance with the subject invention.

The present invention overcomes many of the prior art problems associated with enclosures for large animals. The advantages, and other features of the system disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

Referring to FIG. 1, an enclosure for retaining a large animal such as a horse 102 within a corral 104 is referred to generally by reference numeral 100. In the preferred embodiment, the components of the enclosure are prefabricated at a factory and connected on-site to minimize assembly labor and expense. The enclosure 100 is freestanding and, therefore, suitable for indoor and outdoor use. The enclosure 100 is particularly well-suited for outdoor use in warm environments because the enclosure 100 provides superior ventilation over prior art systems. The enclosure 100 can be repeatedly disassembled and assembled easily for transport and storage as will be apparent from the description below.

Figure 2:
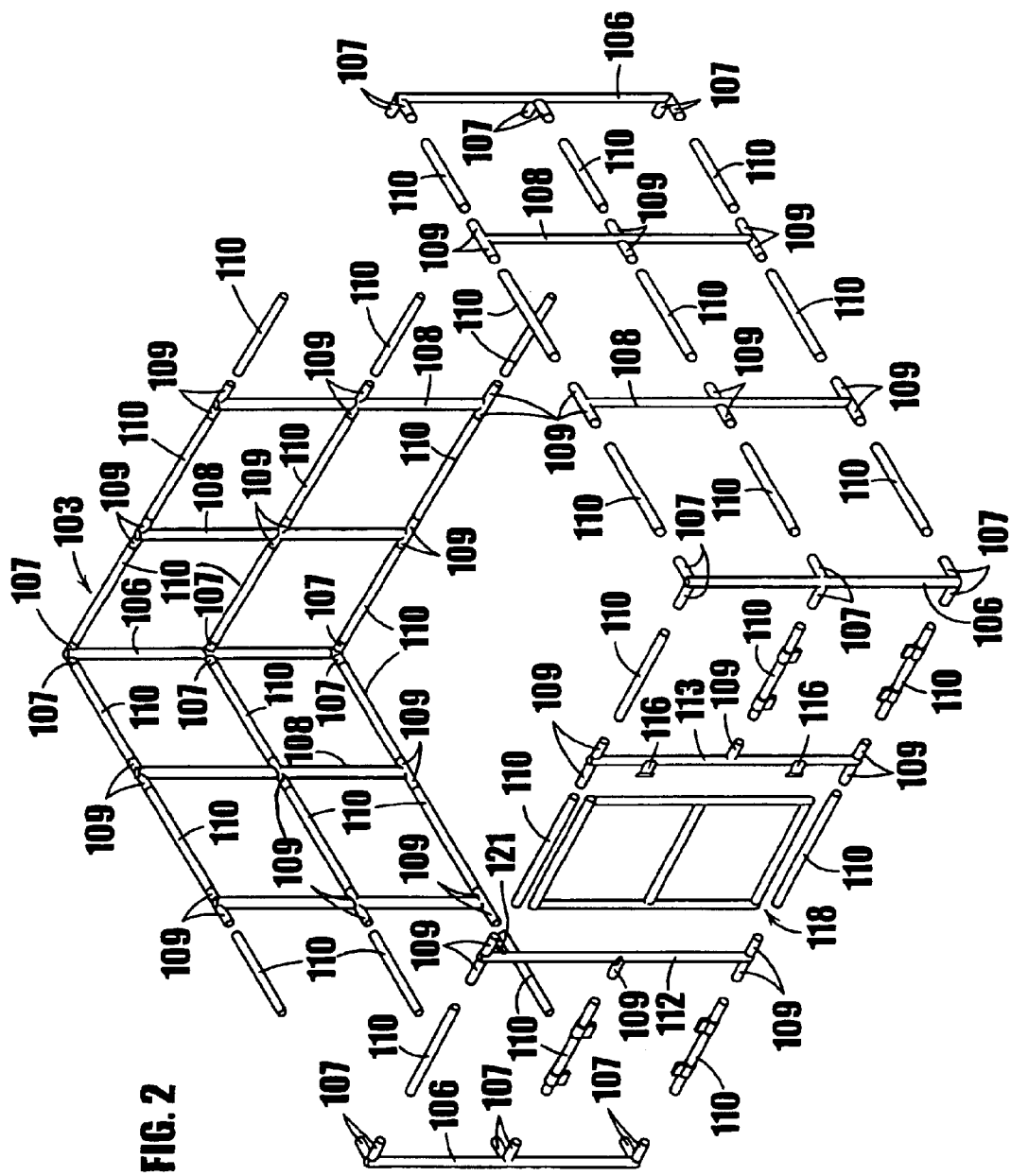
FIG. 2 is an elevated perspective, partially exploded view of the enclosure of FIG. 1.

Referring to FIGS. 1 and 2, the enclosure 100 includes a frame assembly 103 enfolded by a plurality of panels 122, 124. The frame assembly 103 includes four upstanding corner posts 106 which when interconnected form a substantially square area of retention. Each corner post 106 includes six connector fittings 107 which are fixed thereto. The fittings 107 are arranged in pairs at the top, bottom and middle of the corner posts 106. In a preferred embodiment, the three pairs of fittings 107 are welded to the corner posts 106 such that the adjacent fittings 107 are at right angles and each pair is vertically aligned with respect to the others. In an alternative embodiment, the pairs of fittings define a central aperture for sliding onto the frame assembly 103 and being bolted in place. In another alternative embodiment, the two fittings which comprise the pairs may be attached to the corner posts 106 at various angles to form a variety of desirably shaped areas of retention such as without limitation, a triangle, hexagon or pentagon. The fittings 107 are female in that the fittings 107 define an opening for receiving a corresponding male fitting. It will be appreciated by those of ordinary skill in the pertinent art that the male or genderless fittings would serve equally as well.

On three sides of the frame assembly 103 of the enclosure 100, two vertical posts 108 are horizontally spaced between each pair of upstanding corner posts 106. Each vertical post 108 includes three pairs of fittings 109 wherein the adjacent fittings 107 are on opposing sides of the vertical posts 108. The frame assembly 103 also includes a plurality of horizontal cross rails 110 vertically spaced and extending between each upstanding corner post 106 and vertical post 108. More horizontal cross rails 110 span between adjacent vertical posts 108 as well. The horizontal cross rails 110 are received within the respective fittings 107, 109. In a preferred embodiment, the horizontal cross rails 110 define through holes (not shown) and the fittings 107, 109 each define corresponding through holes (not shown) which can be aligned to receive a fastener (not shown) such as a bolt and nut, for selectively fixing the horizontal cross rails 110 to the fittings 107, 109. In another embodiment, the holes in the horizontal cross rails are threaded to alleviate the need for a nut and any potential sharp protrusion which may be associated therewith. Accordingly, the enclosure 100 may be temporarily assembled at a location. Similarly, the enclosure 100 may be temporarily disassembled to clean the area of retention or, in the case where the animals were doing the cleaning (such as when pigs are used to clear brush), the enclosure 100 may moved to a dirty area for cleaning.

On the fourth side of the enclosure 100, two vertical door posts 112, 113 are horizontally spaced between the respective upstanding corner posts 106. Each vertical door post 112, 113 includes two pairs of fittings 109 mounted on its top and bottom. In the middle of the vertical door posts 112, 113 single fittings 109 are mounted so as to open towards the respective upstanding corner posts 106. Six more horizontal cross rails 110 are vertically spaced and extend between each upstanding corner post 106 and vertical door posts 112, 113 while two horizontal cross rails 110 extend between the vertical door posts 112, 113 at the top and bottom. Each of the horizontal cross rails 110 has an end received within the respective fittings 107, 109 and retained by a fastener. A pair of hinges 116 are mounted on the vertical door post 113 for receiving a door frame assembly 118. The door 118 includes a latch 120 (FIG. 5A) which engages the vertical door post 112 for selectively fixing the door 118 in a closed position. The vertical door post 112 also includes a door stop 121 for preventing the door 118 from swinging into the enclosure 100. Preferably, the door 118 disassembles so that when disassembled, the enclosure 100 can be easily stored and transported.

Figure 3:
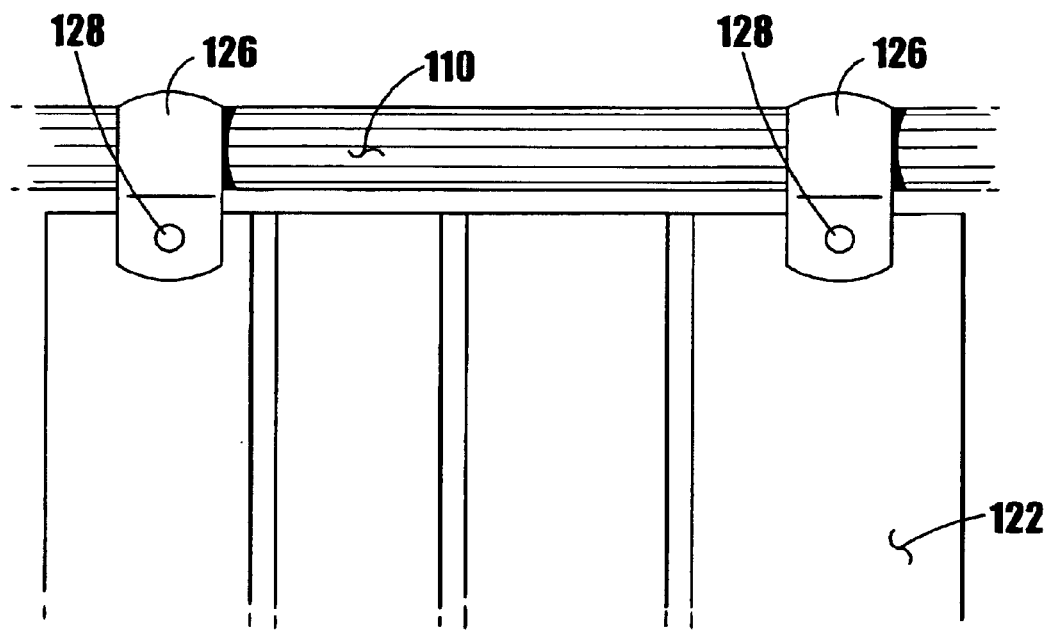
FIG. 3 is a front view of pole straps attaching a wooden panel to the enclosure of FIG. 1.
Figure 4:
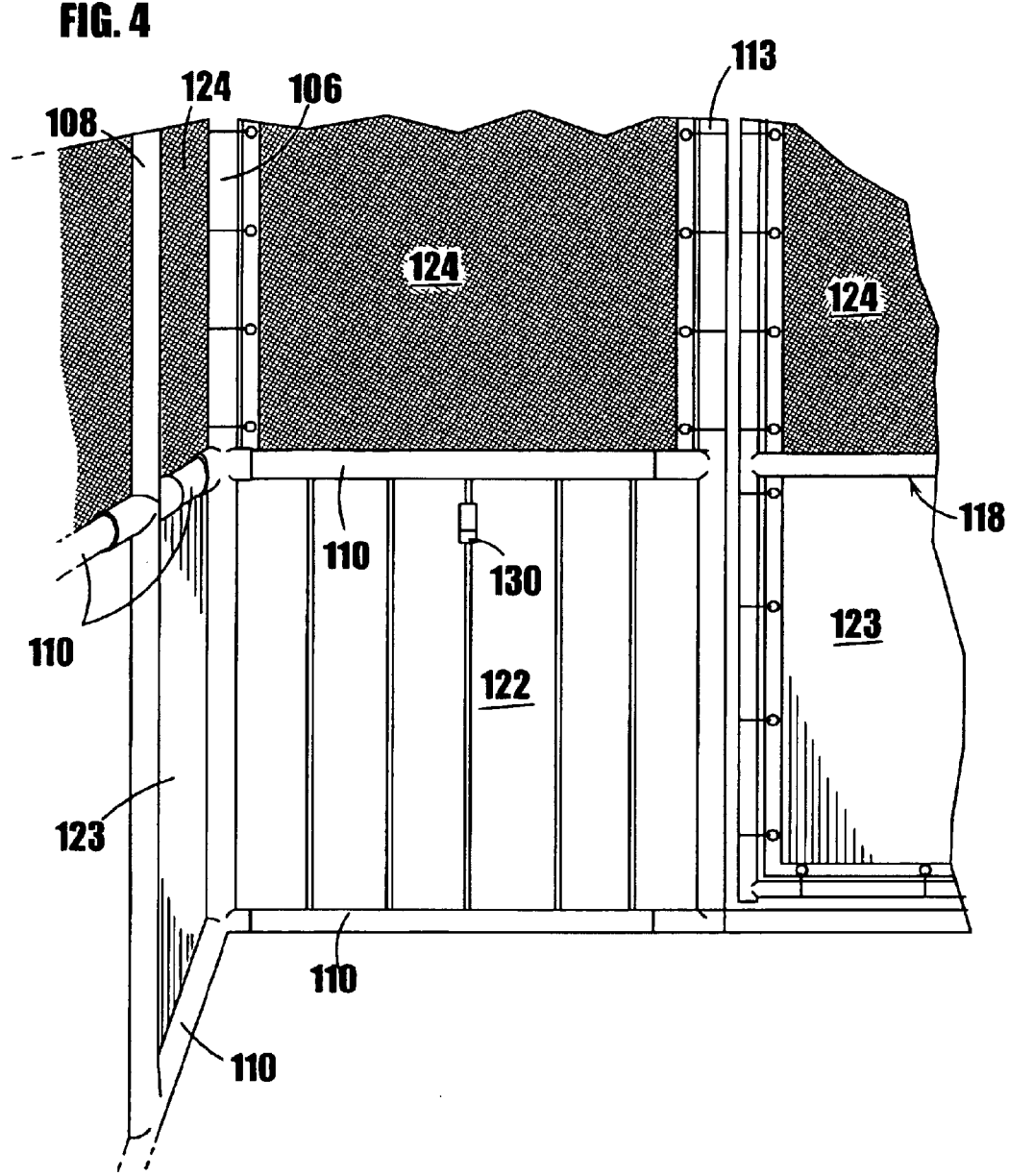
FIG. 4 is an interior view of a bucket holder attached to a wooden panel of the enclosure of FIG. 1.

In a preferred embodiment, two wooden panels 122 releasably secure to the horizontal cross rails 110 to enclose the bottom half of the enclosure 100. The wooden panels 122 define holes (not shown) and are secured to the horizontal cross rails 110 at the top and bottom by two straps 126 with fasteners 128 as shown in FIG. 3. The wooden panels 122 also provide a mounting surface for retaining fixtures as desired. Preferably, bucket holders 130 are mounted on the wooden panels 122 for hanging a feed and water bucket for the enclosed animal as shown in FIG. 4. As would be appreciated by those of ordinary skill in the pertinent art, other fixtures which may be mounted to the wooden panels 122 are, without limitation, tethers, milking equipment and grooming equipment.

Figure 5A:
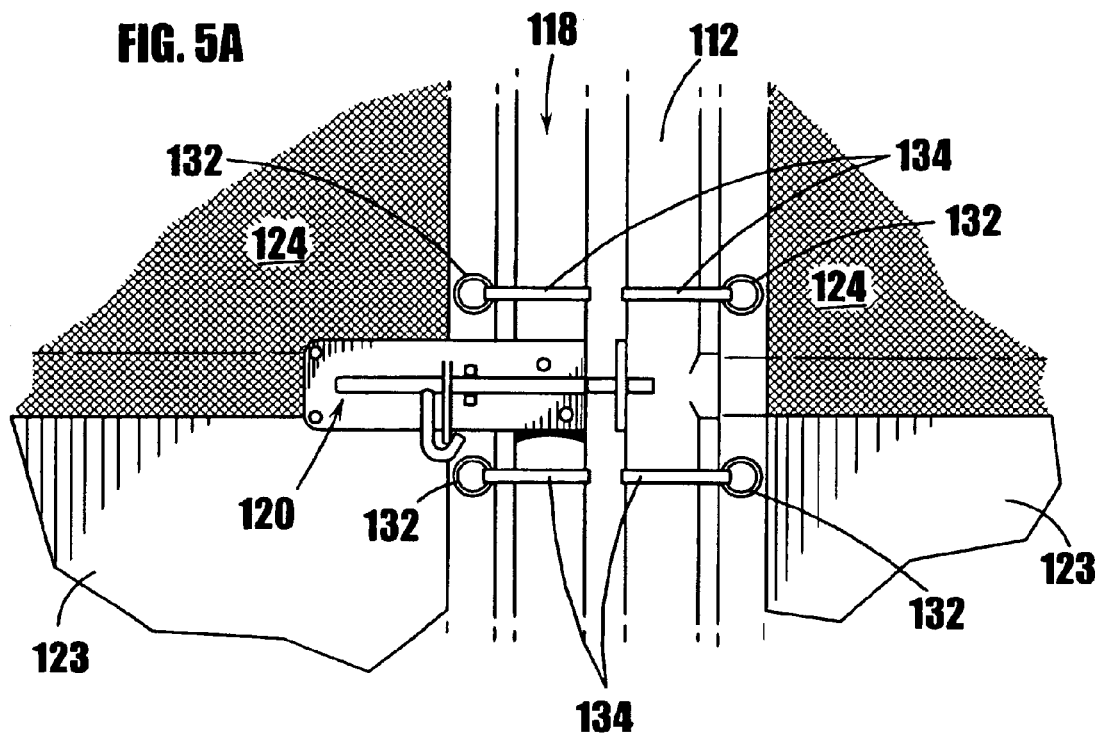
FIG. 5A is a front view of latch for the door of the enclosure of FIG. 1.
Figure 5B:
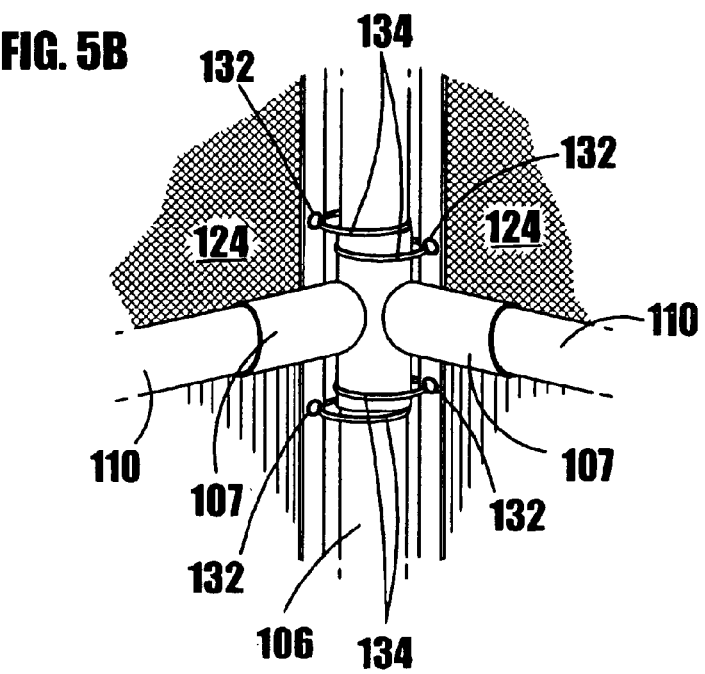
FIG. 5B is an interior view of wire ties attaching panels to the enclosure of FIG. 1.

A plurality of heavy duty solid screen panels 123 releasably secure to the horizontal cross rails 110 to enclose the remaining bottom half of the enclosure 100. A plurality of heavy duty bug screen panels 124 releasably secure to the horizontal cross rails 110 to enclose the top half of the enclosure 100. Preferably, the bug screen panels 124 are mesh and thereby semi-transparent to allow the horse 102 to survey its surroundings. Two panels 123, 124 are also used to enfold the openings defined by the door assembly 118. Grommets 132 are disposed in the panels 123, 124 for sashing the panels 123, 124 by heavy wire ties 134 to the frame assembly 103 of the enclosure 100 as shown in FIGS. 5A and 5B. Preferably, the panels 123, 124 are fabricated from heavy duty vinyl.

It is envisioned that the components of the enclosure 100 may be varied to create a larger or smaller retention area as desired. To create a smaller area, some of the vertical posts 108 and horizontal cross rails 110 can be removed from the enclosure 110. To create a larger area, additional vertical posts 108 and horizontal cross rails 110 can be integrated into the enclosure 110. Panels 122, 124 would be attached as necessary. Similarly, additional door assemblies for multiple entry and exit points may be integrated into the enclosure 100 as would be appreciated by those of ordinary skill in the pertinent art based upon review of the subject disclosure.

Figure 6:
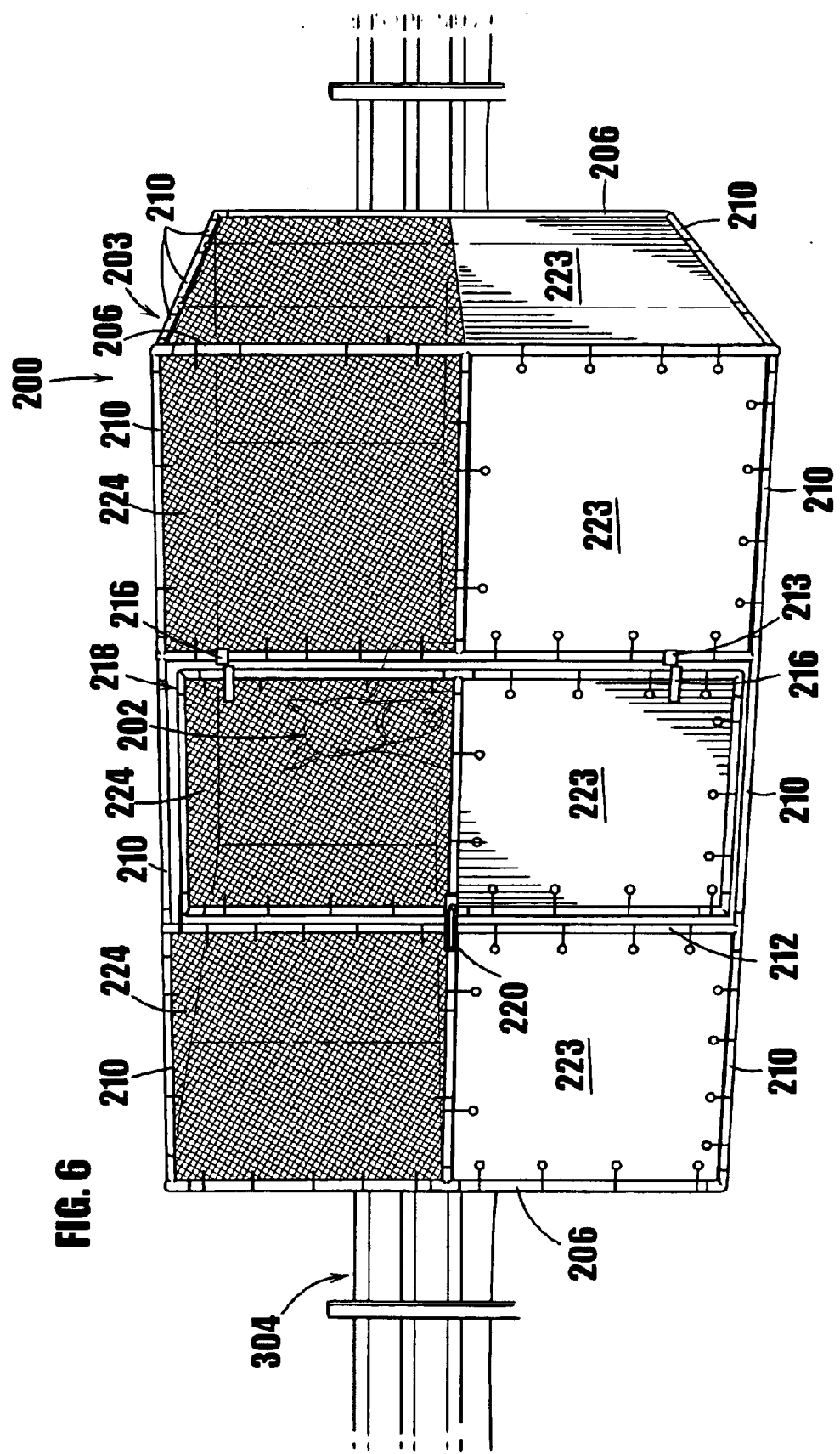
FIG. 6 is a front view of another equine enclosure in accordance with the subject invention.

As will be appreciated by those of ordinary skill in the pertinent art, the enclosures described below utilize the same principles of the enclosure 100 described above. Accordingly, like reference numerals preceded by the numerals "2", "3", "4" and "5" instead of the numeral "1", are used to indicate like elements whenever possible. In another embodiment shown in FIG. 6, the enclosure 200 has bottom panels 223 fabricated from heavy duty rip stop vinyl in combination with bug screen panels 224. It will be appreciated by those of ordinary skill in the pertinent art based upon review of the subject disclosure that any combination of materials such as plastic, vinyl, wood, bug screen and the like may utilized to fabricate the panels.

Figure 7:
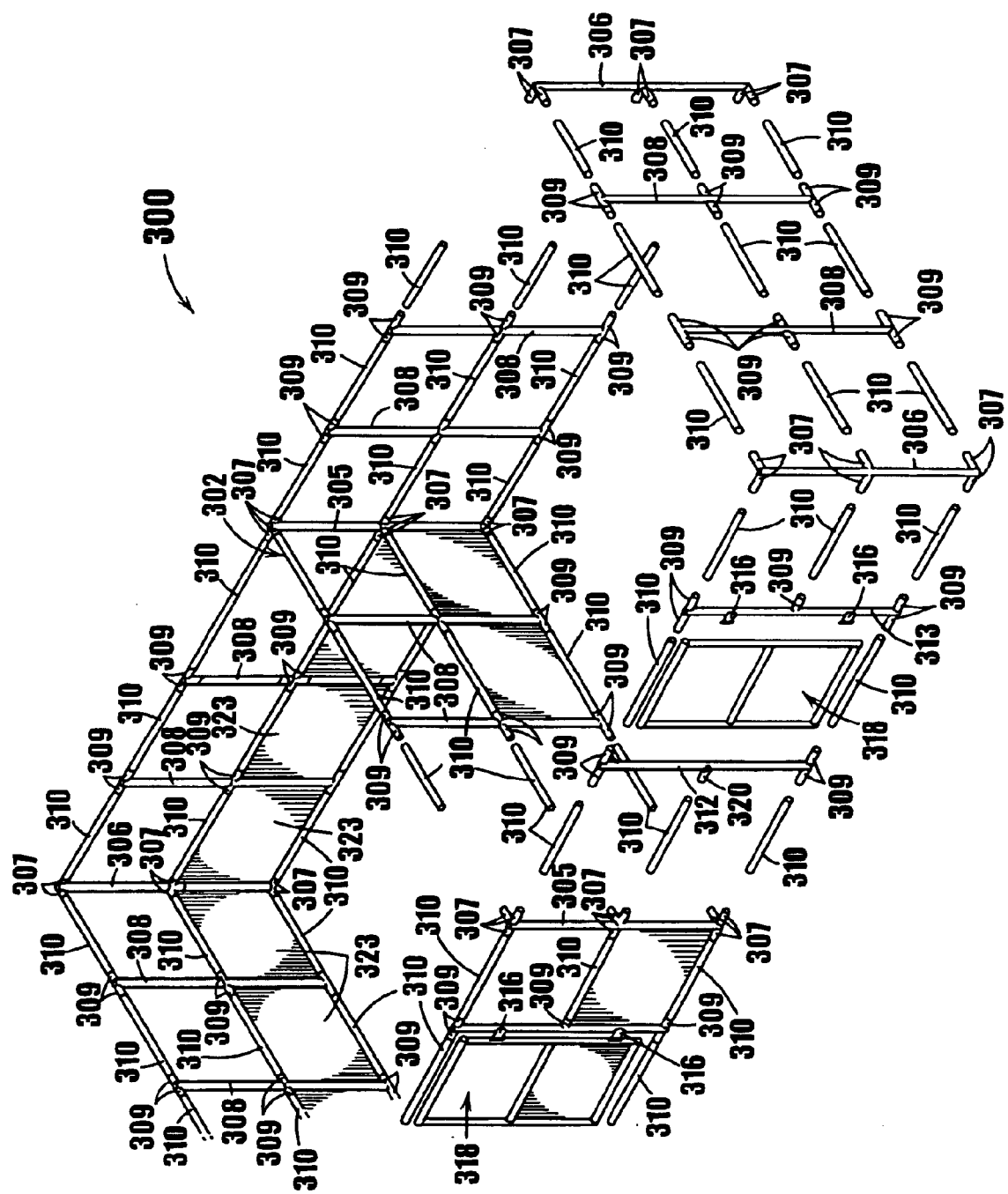
FIG. 7 is a front view of still another equine enclosure in accordance with the subject invention.

Referring to FIG. 7, an enclosure defining two isolated areas of retention is referred to generally by reference numeral 300. The areas of retention share a common wall assembly 302. For simplicity, the description of enclosure 300 is directed only to the differences with the enclosure 100. The common wall 302 includes two upstanding three-way corner posts 305. The three-way corner posts 305 include nine fittings 307 which are fixed thereto. The fittings 307 are arranged in the same horizontal plane to form a T-shape at the top, bottom and middle of the three-way corner posts 305. In another embodiment, the corner posts include twelve fittings arranged in a cross-shape to create three or more areas of retention which share one or more walls. On the common wall 302, two vertical posts 308 are horizontally spaced between the pair of three-way corner posts 305. A plurality of horizontal cross rails 310 extend between the three-way corner posts 305 and vertical post 308 as well as between the adjacent vertical posts 108 to form the common wall 302.

Referring now to FIGS. 8 and 10, as will be appreciated by those of ordinary skill in the pertinent art, the enclosures 400 and 500, respectively, utilize the same principles of the enclosure 101 described above. Accordingly, like reference numerals preceded by the numeral "4", and/or the numeral "5" instead of the numeral "1", are used to indicate like elements whenever possible.

Figure 9A:
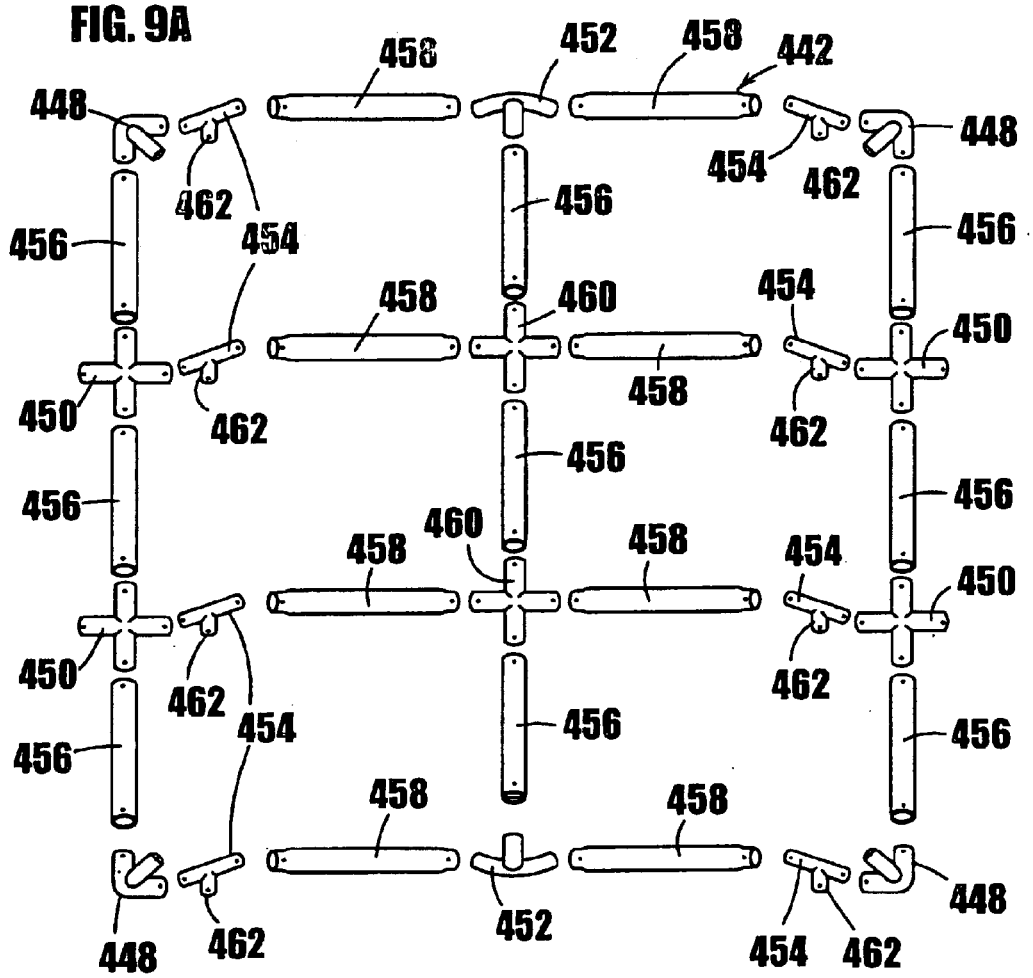
FIG. 9A is a perspective view of an assembled roof frame of the enclosure of FIG. 8.
Figure 9B:
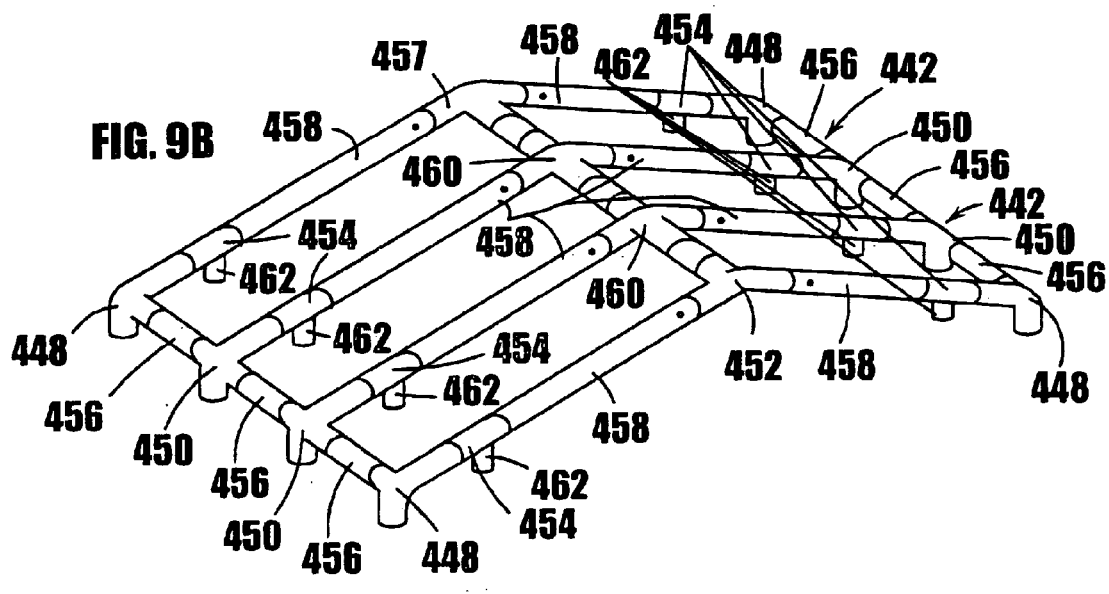
FIG. 9B is an exploded view of the roof frame of the enclosure of FIG. 8.

Referring now to FIGS. 8, 9A and 9B, an enclosure 400 includes a roof 440 for shielding the area of retention from the elements. The roof 440 comprises a frame 442 with a cover 444 sashed thereto. Triangular end panels 446 (only one shown) span between the frame 442 and horizontal cross rails 410 to further shield the area of retention from the elements. The cover 444 and end panels 446 are preferably heavy duty rip stop vinyl with grommets (not shown) for securing the covering 444 to the frame 442.

The frame 442 of the roof 440 has a periphery formed from four corner connectors 448, four-way side connectors 450, three-way top connectors 452 and three-way joiners 454. Roof rails 456 extend between the corner connectors 448 and four-way side connectors 450 to form the apex 457 of the roof 440. Roof rafters 458 extend between the three-way top connectors 452 and three-way joiners 454 to complete the substantially square periphery. The interior of the periphery of the frame 442 is supported by more roof rails 456 and rafters 458 extending between additional three-way joiners 454 and four-way top connectors 460. When assembled, the three-way joiners 454 have a depending portion 462 which engages the upstanding corner posts 406 and vertical posts 408 for securing the roof 440 to the enclosure 400. Referring now to FIG. 10, another enclosure 500 for two animals is shown. The enclosure 500 includes a roof 540 with additional depending portions 562 for additional structural support and securement.

While the invention has been described with respect to preferred embodiments, those skilled in the art will readily appreciate that various changes and/or modifications can be made to the invention without departing from the spirit or scope of the invention as defined by the appended claims.

What is claimed is:

1. An enclosure for temporarily retaining large animals in a defined area comprising:
   at least six upstanding first posts defining corners of a frame, a first area of retention and a second area of retention of the enclosure;
   a plurality of upstanding second posts, horizontally spaced between the upstanding first posts;
   at least two cross rails vertically spaced and extending between each pair of upstanding first posts and upstanding second posts to enclose the first and second areas of retention;
   a plurality of connector fittings for securing the cross rails to the upstanding first posts and second posts and forming the frame for the enclosure, wherein the connector fittings secured to at least two of the upstanding first posts are T-shaped connector fittings for receiving the cross rails to thereby have the second area of retention which shares a common wall with the first area of retention;
   a plurality of panels secured to the frame; and
   a first and second door pivotally mounted to the frame for providing ingress and egrees from the first and second areas of retention of the enclosure, respectively.

2. An enclosure as recited in claim 1, wherein the at least two cross rails extend between respective upstanding first posts and upstanding second posts to form upper openings and lower openings, and a portion of the plurality of panels releasably enclose the upper and lower openings.

3. An enclosure as recited in claim 1, wherein at least one of the panels defines a substrate forming a mounting surface for securing a fixture thereto.

4. An enclosure as recited in claim 3, further comprising a fixture in the form of a bucket holder secured to the mounting surface.

5. An enclosure as recited in claim 3, further comprising a fixture in the form of a tether secured to the mounting surface.

6. An enclosure as recited in claim 1, further comprising a door pivotally mounted to one of the upstanding first posts and upstanding second posts.

7. An enclosure as recited in claim 1, wherein at least one of the plurality of panels are mesh for providing ventilation and sight lines, and substantially preventing bugs from passing therethrough.

8. An enclosure as recited in claim 1, further comprising a roof secured to the enclosure.

9. An enclosure as recited in claim 8, wherein the roof has an overhang, the roof being secured to the enclosure for shielding the first and second area of retention from rain, snow and sun.

10. An enclosure as recited in claim 8, wherein the roof has an apex.

11. An enclosure as recited in claim 8, further comprising end panels spanning between the enclosure and the roof.

* * * * *